United States Patent
Kurai

(10) Patent No.: US 12,249,196 B2
(45) Date of Patent: Mar. 11, 2025

(54) METHOD AND SYSTEM FOR MEASURING STEERING ANGLE ERROR OF VEHICLE

(71) Applicant: Honda Motor Co., Ltd., Tokyo (JP)

(72) Inventor: Kenichiro Kurai, Tokyo (JP)

(73) Assignee: Honda Motor Co., Ltd., Tokyo (JP)

(\*) Notice: Subject to any disclaimer, the term of this patent is extended or adjusted under 35 U.S.C. 154(b) by 202 days.

(21) Appl. No.: 18/089,568

(22) Filed: Dec. 28, 2022

(65) Prior Publication Data

US 2023/0260339 A1 Aug. 17, 2023

(30) Foreign Application Priority Data

Feb. 17, 2022 (CN) .............................. 202210148383

(51) Int. Cl.
  *G07C 5/08* (2006.01)
  *B62D 15/02* (2006.01)
(52) U.S. Cl.
  CPC ......... *G07C 5/0808* (2013.01); *B62D 15/021* (2013.01)
(58) Field of Classification Search
  CPC .......................... G07C 5/0808; B62D 15/021
  See application file for complete search history.

(56) References Cited

FOREIGN PATENT DOCUMENTS

| JP | 2002370665 | A | * | 12/2002 |
| JP | 2014081260 |   |   | 5/2014 |
| JP | 2016199080 | A | * | 12/2016 |

OTHER PUBLICATIONS

English Machine Translation JP-2002370665-A (Year: 2002).*
English Machine Translation JP-2016199080-A (Year: 2016).*

\* cited by examiner

*Primary Examiner* — Andrew J Cromer
(74) *Attorney, Agent, or Firm* — JCIPRNET

(57) ABSTRACT

The disclosure provides a method and system for measuring steering angle error of a vehicle. The method includes the following steps: a rotating step is performed first, and the rotating step is to continuously rotate the steering wheel left and right between a left position relative to the center and a right position relative to the center when the vehicle is driving. A time-series change of the steering angle of the vehicle and a time-series change of a turning radius of the vehicle in the rotating step are obtained to calculate a response delay of the turning radius. Afterwards, the correlation expression of the turning radius is calculated, and the correlation expression corrects the response delay corresponding to the steering angle at multiple time points. Based on the correlation expression, the steering angle under the condition where the turning radius is 0 is defined as the steering angle error.

6 Claims, 4 Drawing Sheets

METHOD AND SYSTEM FOR MEASURING STEERING ANGLE ERROR OF VEHICLE

CROSS-REFERENCE TO RELATED APPLICATION

This application claims the priority benefit of China application no. 202210148383.1, filed on Feb. 17, 2022. The entirety of the above-mentioned patent application is hereby incorporated by reference herein and made a part of this specification.

BACKGROUND

Technical Field

The present disclosure relates to a method and system for measuring steering angle error of a vehicle.

Description of Related Art

In related art, within a distance of about 100 meters and a fixed speed range, the steering angle error of the vehicle can be accurately measured at a stable point when the vehicle is going straight. However, the measurement requires the skill of the driver and a large driving area, and the steering gear ratio and wheelbase need to be set for different vehicle types for correction.

SUMMARY

The present disclosure is directed to a method and a system for measuring steering angle error of a vehicle, which is able to calculate the steering angle of the vehicle when the vehicle is going straight at a low speed in a short time, and without setting for different vehicle types.

The method for measuring the steering angle error of a vehicle of the present disclosure includes the following steps. First, a rotating step is performed, and the rotating step is to continuously rotate the steering wheel left and right between a left position relative to the center and a right position relative to the center when the vehicle is in a driving state. Next, a time-series change of the steering angle of the vehicle and a time-series change of a turning radius of the vehicle in the rotating step are obtained to calculate a response delay of the turning radius. Afterwards, the correlation expression of the turning radius is calculated, and the correlation expression corrects the response delay corresponding to the steering angle at multiple time points. Based on the correlation expression, the steering angle under the condition where the turning radius is 0 is defined as the steering angle error.

The system for measuring the steering angle error of a vehicle of the present disclosure includes an inertial sensor, a steering angle sensor and a processing device. The inertial sensor is configured to measure the acceleration and angular velocity of the vehicle. The steering angle sensor is configured to measure the steering angle of the vehicle. When the vehicle performs the rotating step, the processing device obtains the acceleration and angular velocity of the vehicle from the inertial sensor, and obtains the steering angle of the vehicle from the steering angle sensor, and then obtains the time-series change of the steering angle of the vehicle and the time-series change of the turning radius of the vehicle in the rotating step to calculate the response delay of the turning radius. The rotating step is performed as follows: when the vehicle is in the driving state, the steering wheel is continuously rotated left and right between the left position relative to the center and the right position relative to the center. The processing device is further configured to calculate the correlation expression of the turning radius, and based on the correlation expression, the steering angle under the condition where the turning radius is 0 is defined as the steering angle error. The correlation expression corrects the response delay corresponding to the steering angle at multiple time points.

BRIEF DESCRIPTION OF THE DRAWINGS

The accompanying drawings are included to provide a further understanding of the present disclosure, and are incorporated in and constitute a part of this specification. The drawings illustrate embodiments of the disclosure and together with the description serve to explain the principles of the disclosure.

DESCRIPTION OF THE EMBODIMENTS

Figure 1:
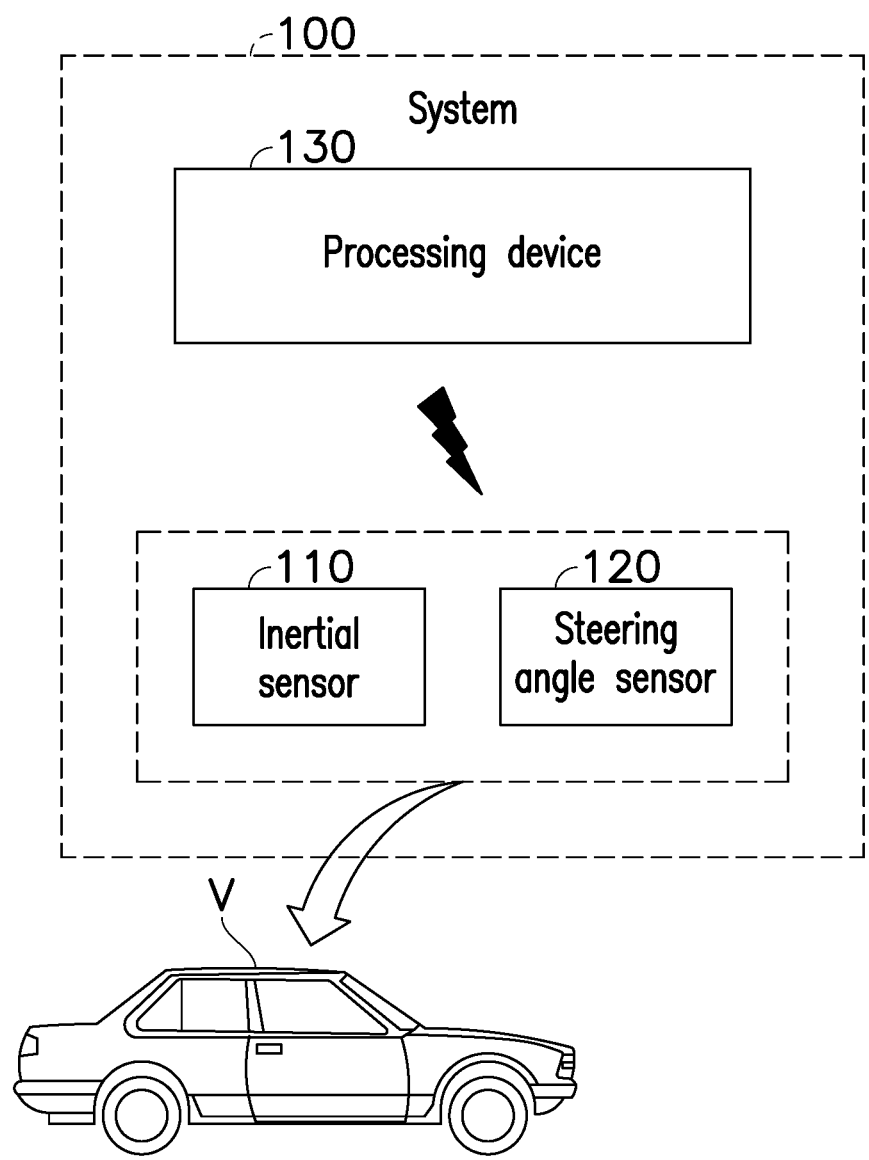
FIG. 1 is a schematic diagram of a system for measuring a steering angle error of a vehicle according to an embodiment of the present disclosure.

Reference will now be made in detail to the exemplary embodiments of the present disclosure, examples of which are illustrated in the accompanying drawings. Wherever possible, the same reference numerals are used in the drawings and description to refer to the same or like parts.

In an embodiment according to the present disclosure, in the rotating step, the steering wheel is continuously rotated left and right along a meandering guide on the driving path.

FIG. 1 is a schematic diagram of a system for measuring a steering angle error of a vehicle according to an embodiment of the present disclosure. First of all, FIG. 1 first illustrates each component and configuration relationship in a control device, and detailed functions will be disclosed together with subsequent embodiments.

Referring to FIG. 1 first, a system 100 in this embodiment at least includes an inertial sensor 110, a steering angle sensor 120, and a processing device 130. The inertial sensor 110 is disposed on a vehicle V, and includes, for example, an acceleration sensor for measuring the acceleration of the vehicle V and a gyro sensor for measuring the angular velocity change of the vehicle V. The steering angle sensor 120 is disposed on the vehicle V to measure the steering angle and the driving direction of the vehicle V. The processing device 130 includes a memory and a processor. The memory is configured to store data, such as any type of fixed or removable random access memory (RAM), read-only memory (ROM), flash memory, hard disk or other similar devices, integrated circuits and combinations thereof. The processor is configured to perform arithmetic processing on the measurement data of the inertial sensor 110 and the steering angle sensor 120, and the processor is, for example, a central processing unit (CPU), or other programmable general-purpose or special-purpose microprocessors, digital signal processor (DSP), programmable controller, application specific integrated circuits (ASIC), programmable logic device (PLD), application processor (AP), or other similar devices or a combination of these devices.

In this embodiment, the processing device 130 may be, for example, a cloud server or a portable electronic device, which is able to obtain the measurement data of the inertial sensor 110 and the steering angle sensor 120 by means of wireless transmission through a network. In another embodiment, the processing device 130 may be, for example, an electronic device disposed on the vehicle V, which is able to obtain the measurement data of the inertial sensor 110 and the steering angle sensor 120 through wired transmission, which is not limited in the present disclosure.

Figure 2:
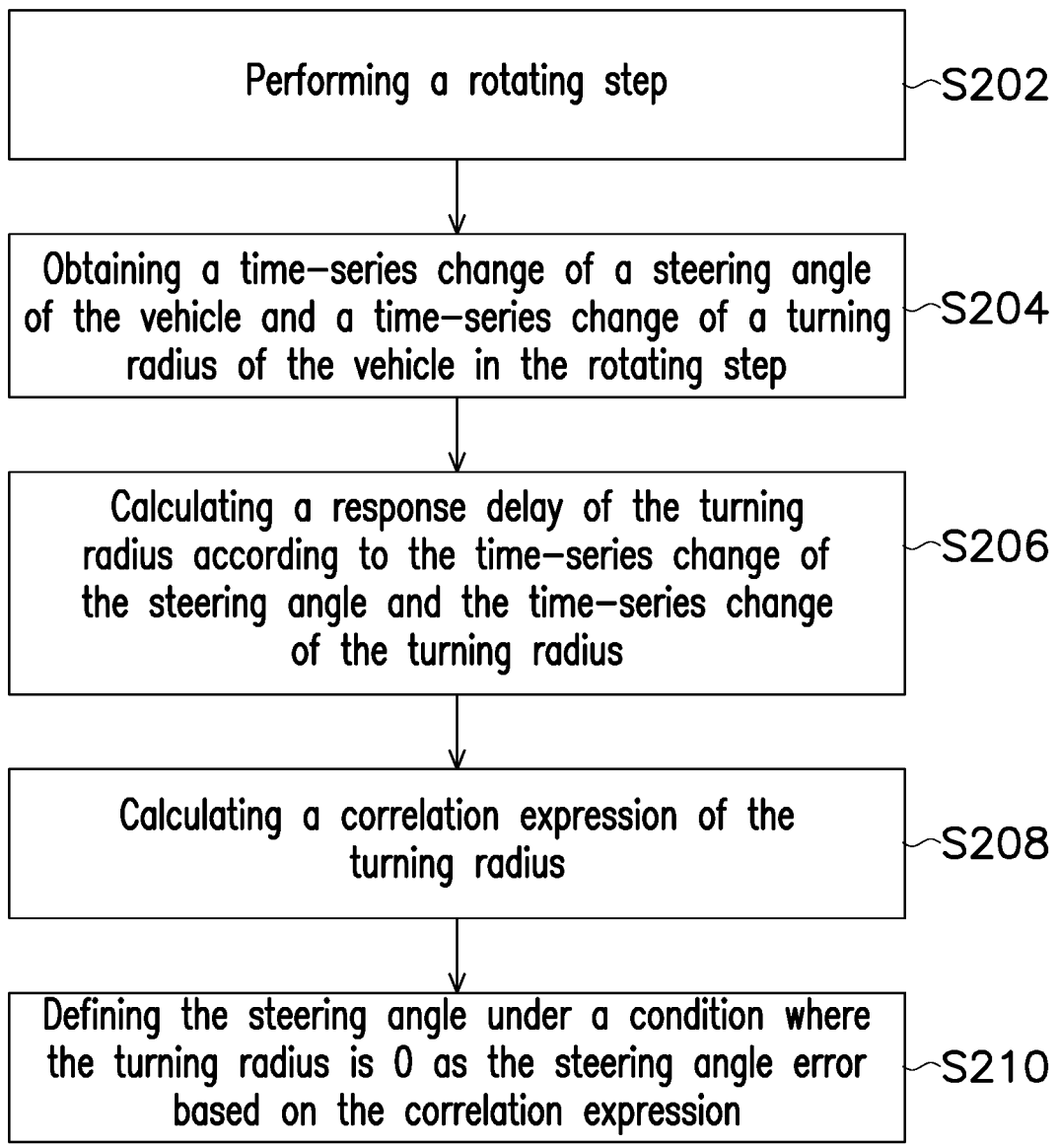
FIG. 2 is a flowchart of a method for measuring a steering angle error of a vehicle according to an embodiment of the present disclosure.

FIG. 2 is a flowchart of a method for measuring steering angle error of a vehicle according to an embodiment of the present disclosure, and the flowchart of the method of FIG. 2 may be implemented by the system 100 of FIG. 1.

Figure 3:
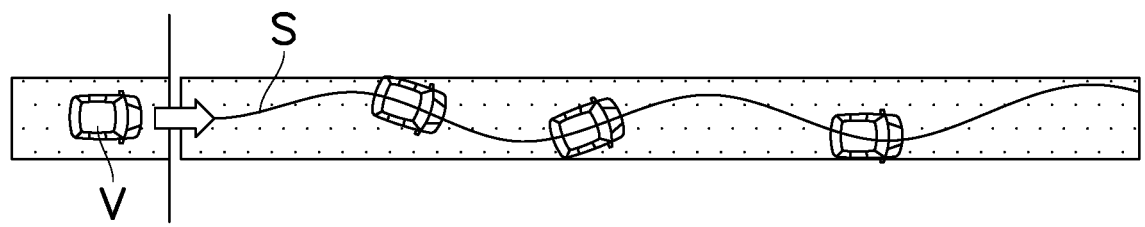
FIG. 3 is a schematic diagram of a vehicle in a driving state according to an embodiment of the present disclosure.

Please refer to FIG. 1 and FIG. 2 at the same time. First, a rotating step is performed (step S202). The rotating step is defined here as: when the vehicle V is in a driving state, the steering wheel is continuously rotated left and right between a left position relative to the center and a right position relative to the center, and the rotation of the steering wheel may be controlled by the driver of the vehicle V or the automatic driving controller of the vehicle V. Take the schematic diagram of the vehicle in a driving state shown in FIG. 3 according to an embodiment of the present disclosure as an example. After the measurement starts, the driver will drive the vehicle V in a meandering and circuitous path according to the meandering guide S, and the meandering guide S may be a meandering line drawn on the road as a sign for the vehicle V to follow. From another perspective, the steering wheel continuously rotates left and right along the meandering guide S on the driving path.

Next, the processing device 130 of the system 100 acquires the time-series change of the steering angle of the vehicle V and the time-series change of the turning radius of the vehicle V in the rotating step (step S204). Here, the steering angle of the vehicle V may be the steering angle measured by the steering angle sensor 120, and the turning radius of the vehicle V may be calculated based on the speed and the angular velocity (yaw angular velocity, that is, the angular velocity in changes of direction when the vehicle V is viewed from above) of the vehicle V, for example, in the following formula (1):

$$\text{Speed} = \text{Radius} \times \text{Angular Velocity} \quad (1)$$

The speed of the vehicle V may be obtained by integrating the acceleration measured by the acceleration sensor with time, and the angular velocity may be obtained by adopting the angular velocity measured by the gyro sensor.

Figure 4:
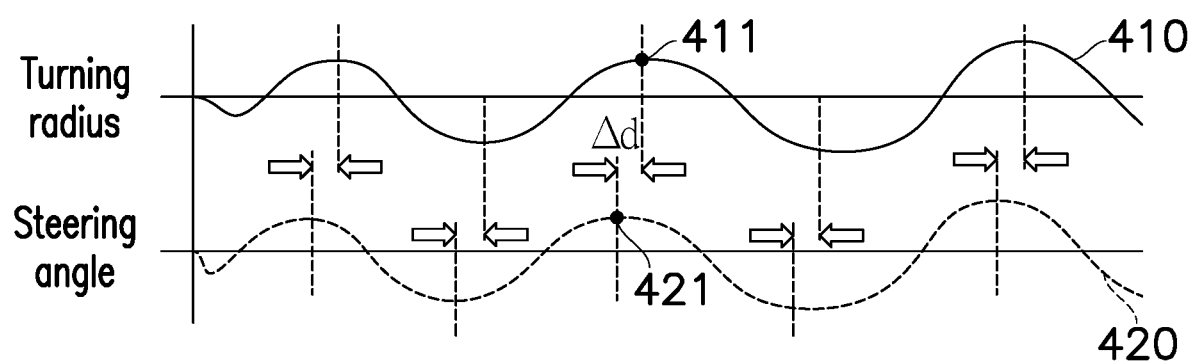
FIG. 4 is a schematic diagram of a response delay of a turning radius according to an embodiment of the present disclosure.

Next, the processing device 130 of the system 100 calculates the response delay of the turning radius according to the time-series change of the steering angle and the time-series change of the turning radius (step S206). The processing device 130 may perform calculation by utilizing the peaks of the time-series change of steering angle and the time-series change of turning radius. Taking the schematic diagram of the response delay of the turning radius shown in FIG. 4 according to an embodiment of the present disclosure as an example, 410 is the time-series change of the turning radius, and 420 is the time-series change of the steering angle. The response delay Ad of the turning radius may be calculated through the peak 411 and the peak 421.

Figure 5:
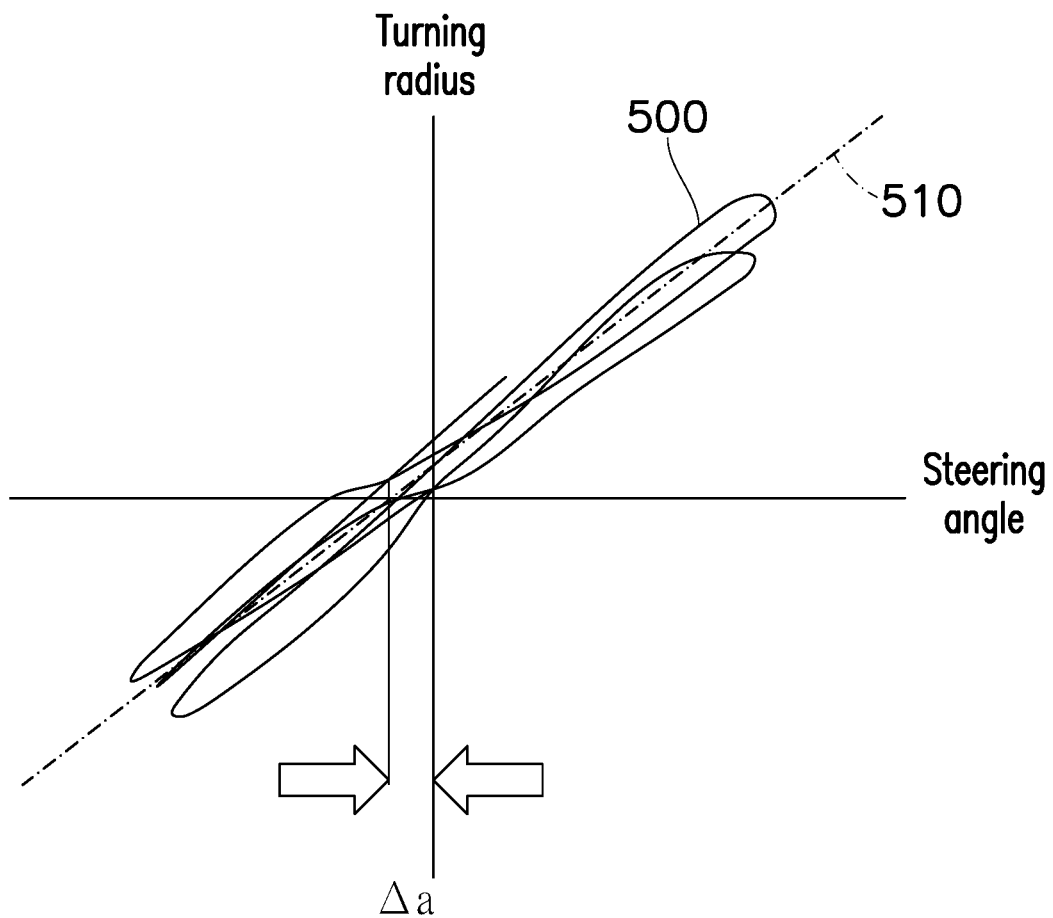
FIG. 5 is a graph showing the relationship between a turning radius and a steering angle according to an embodiment of the present disclosure.

Thereafter, the processing device 130 will calculate the correlation expression of the turning radius (step S208), and the correlation expression is adopted to correct the response delay corresponding to the steering angle at multiple time points. Next, the processing device 130 defines the steering angle under the condition where the turning radius is 0 as the steering angle error based on the correlation expression (step S210). In other words, the steering angle error is the steering angle in the state of driving straight, and is also the spoke angle error. Taking the graph showing a relationship between the turning radius and the steering angle shown in FIG. 5 according to an embodiment of the present disclosure as an example, 500 is the relationship data between the steering angle and the turning radius within a certain speed range after correction of time series, and any algorithm may be used to find an approximate fitting line 510 of the relationship data 500. Here, the steering angle Aa at which the fitting line 510 intersects with the turning radius of 0 is the steering angle error, which is also the spoke angle error.

In this embodiment, since the steering angle error may be calculated according to the relationship between the steering angle and the turning radius, there is no need to set the steering gear ratio and the wheelbase for different vehicle types. In addition, in this embodiment, all the data may be adopted for the calculation of the steering angle error. That is, a large amount of data may be collected in a short period of time at low speeds (e.g. travel time required within 20 meters and vehicle speed within 10 km/h) without the need for the vehicle to drive steadily (e.g. a steering range of ±20 degrees). Therefore, there is no need to require a certain driving skill to complete the measurement. As a side note, since driving stability is distinguishable from response delay, it helps to separate control from suspension flaws from a graph to discover potential problems of the vehicle.

To sum up, the method and system for measuring the steering angle error of a vehicle provided by the present disclosure are able to correct the response delay according to the time-series change of the steering angle of the vehicle and the time-series change of the turning radius of the vehicle through meandering driving. The steering angle in the state of driving straight may be calculated under the condition of low speed and short time, and there is no need to set for different vehicle types.

Finally, it should be noted that: the above embodiments are only used to illustrate the technical solutions of the present disclosure, but not to limit them; although the present disclosure has been described in detail with reference to the foregoing embodiments, those of ordinary skill in the art should understand: modifications may still be made to the technical solutions described in the foregoing embodiments, or some or all of the technical features thereof are equivalently replaced; and these modifications or replacements do not make the essence of the corresponding technical solutions depart from the scope of the technical solutions of the embodiments of the present disclosure.

What is claimed is:

1. A method for measuring a steering angle error of a vehicle, comprising:
   performing a rotating step, wherein the rotating step is to continuously rotate a steering wheel left and right between a left position relative to a center and a right position relative to the center when the vehicle is driving along a driving path for a predetermined distance;
   obtaining a time-series change of a steering angle of the vehicle and a time-series change of a turning radius of the vehicle in the rotating step;

calculating a response delay of the turning radius at each of a plurality of time points according to the time-series change of the steering angle and the time-series change of the turning radius;

calculating a correlation expression of the turning radius according to the response delay of the turning radius at each of the plurality of time points, wherein the correlation expression corrects the response delay corresponding to the steering angle at each of the plurality of time points; and defining the steering angle under a condition where the turning radius is 0 as the steering angle error of the vehicle based on the correlation expression.

2. The method according to claim 1, wherein in the rotating step, the steering wheel is continuously rotated left and right along a meandering guide on the driving path for the predetermined distance.

3. The method according to claim 1, wherein in the rotating step, the steering wheel is continuously rotated left and right such that the vehicle is driving along a meandering route for the predetermined distance.

4. The method according to claim 1, wherein the response delay of the turning radius at each of the plurality of time points is calculated according to peaks of the time-series change of the steering angle and peaks of the time-series change of the turning radius.

5. A system for measuring a steering angle error of a vehicle, comprising:

an inertial sensor, configured to measure an acceleration and an angular velocity of the vehicle;

a steering angle sensor, configured to measure a steering angle of the vehicle; and a processing device, configured to:

when the vehicle performs a rotating step, obtain the acceleration and the angular velocity of the vehicle from the inertial sensor, and obtain the steering angle of the vehicle from the steering angle sensor, and then obtain a time-series change of the steering angle of the vehicle and a time-series change of a turning radius of the vehicle in the rotating step, wherein the rotating step is performed as follows:

when the vehicle is driving along a driving path for a predetermined distance, continuously rotating a steering wheel left and right between a left position relative to a center and a right position relative to the center;

calculate a response delay of the turning radius at each of a plurality of time points according to the time-series change of the steering angle and the time-series change of the turning radius;

calculate a correlation expression of the turning radius according to the response delay of the turning radius at each of the plurality of time points, wherein the correlation expression corrects the response delay corresponding to the steering angle at each of the plurality of time points; and define the steering angle under a condition where the turning radius is 0 as the steering angle error of the vehicle based on the correlation expression.

6. The system according to claim 5, wherein in the rotating step, the steering wheel is continuously rotated left and right along a meandering guide on the driving path for the predetermined distance.

\* \* \* \* \*